Figure 5:
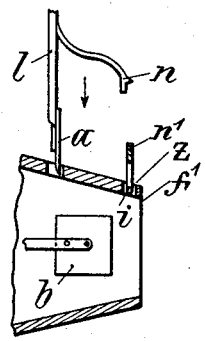

W. SCHLEUNING.
APPARATUS FOR MANUFACTURING HOLLOW BRICKS WITH CLOSED ENDS.
APPLICATION FILED JUNE 9, 1910.
1,063,071.
Patented May 27, 1913.
2 SHEETS—SHEET 1.
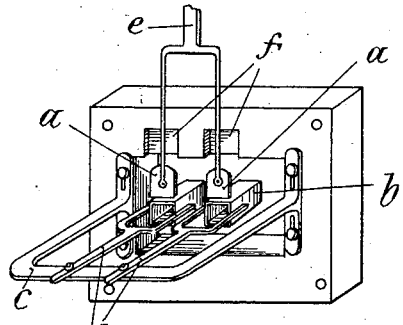
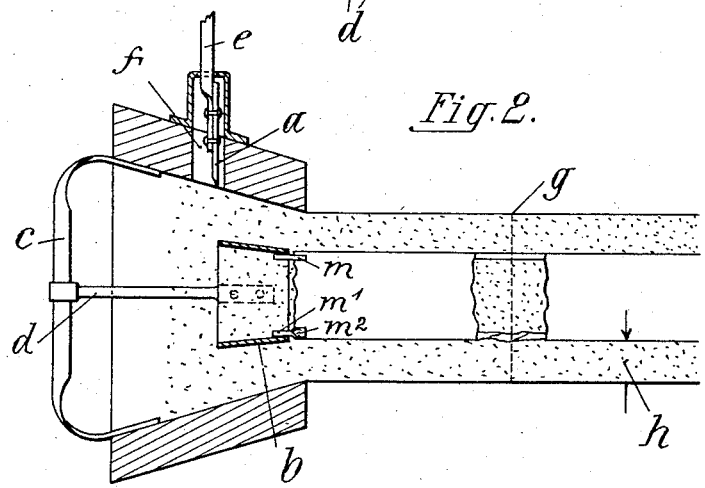
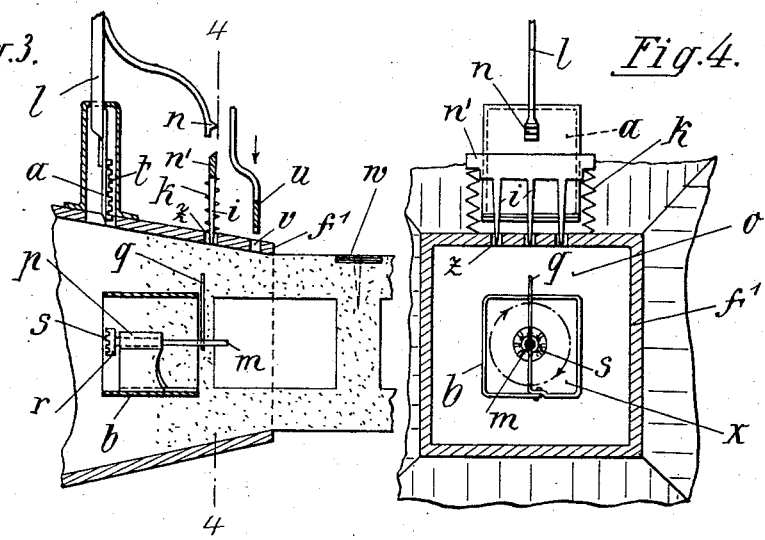

W. SCHLEUNING.
APPARATUS FOR MANUFACTURING HOLLOW BRICKS WITH CLOSED ENDS.
APPLICATION FILED JUNE 9, 1910.

1,063,071.

Patented May 27, 1913.

2 SHEETS—SHEET 2.

Witnesses.
R. E. Barry
J. K. Moore

Inventor.
Wilhelm Schleuning
By Whitaker Prevost
Attys.

UNITED STATES PATENT OFFICE.

WILHELM SCHLEUNING, OF FRIEDENAU, GERMANY.

APPARATUS FOR MANUFACTURING HOLLOW BRICKS WITH CLOSED ENDS.

1,063,071. Specification of Letters Patent. Patented May 27, 1913.

Application filed June 9, 1910. Serial No. 566,059.

*To all whom it may concern:*

Be it known that I, WILHELM SCHLEUNING, a subject of the German Emperor, residing at Isolderstrasse 8, Friedenau, in the German Empire, have invented a new and useful Apparatus for Manufacturing Hollow Bricks with Closed Ends; and I do hereby declare that the following is a full, clear, and exact description of the invention, which will enable others skilled in the art to which it appertains to make and use the same.

According to this invention hollow bricks with closed ends are manufactured by means of presses by first producing an endless hollow column and then forming the end closures in the form of plate-like plugs which are produced in the mouth-piece of the press and are periodically inserted in the formed hollow column. This is effected by placing inside the mouth-piece thin tubular hollow bodies or cores which are axial with the column and may be closed by a flat or curved cutter or slide instead of the solid core by which the clay has hitherto been shaped to form a hollow column. The thin cutters or slides which are preferably in the form of plates can easily pass through the column without altering its shape.

When the cutters or slides are situated in front of the hollow cores, the press will deliver a uniform hollow column. As the columns formed in the interior of the hollow core are inserted into the continuous hollow column as plugs when the slides have been removed, the hollow column is at intervals provided with closures. If the column is severed at those places where the plugs are situated, the plugs will remain as plate-like closures for the ends.

Although hollow bricks made according to the process described above and having closed ends, hold the closures at their ends securely, it has yet been found advantageous in practice to provide for a better union between the hollow column and plugs. It has further been found necessary to provide the manufactured bricks with a hole for the escape of the steam formed in their interior during the firing process, and means have also been provided to facilitate the safe severing of the individual bricks of the column and the correct measuring and marking of the length and position of the closing plugs.

To enable my invention to be fully understood I will describe the same by reference to the accompanying drawing, in which:—

Figure 6:
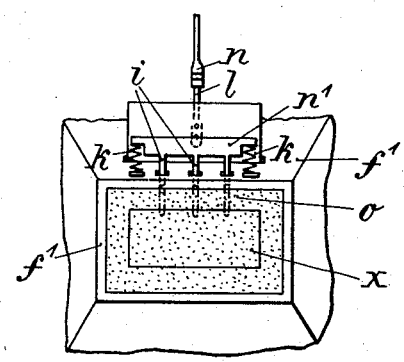
Figure 7:
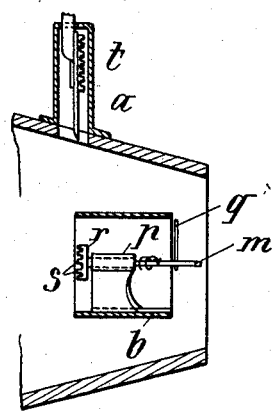
Figure 8:
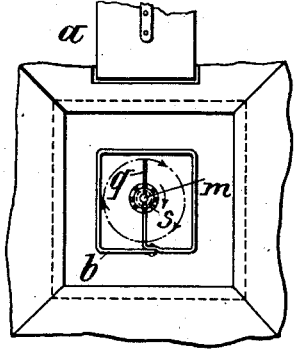
Figure 9:
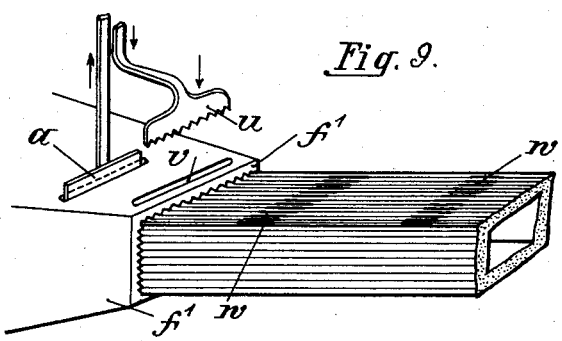

Figure 1 is a perspective view of the mouth-piece of a press showing its accessories for the manufacture of hollow bricks according to the invention, Fig. 2 is a section of a mouth-piece showing the extruding column and the method of severing. Fig. 3 is a view similar to Fig. 2 showing a modified form of the apparatus. Fig. 4 is a vertical transverse sectional view on the line 4—4 of Fig. 3. Figs. 5 and 6 illustrate arrangements for uniting the inner plug and the outer hollow column. Figs. 7 and 8 illustrate an arrangement for severing the closing plugs. Fig. 9 illustrates one method of marking the places where the plugs are situated.

In the various figures, $a$ are the movable slides and $b$ the hollow cores which are supported by the stirrups $c$ and rods $d$. In Figs. 1 and 2 the slides are thin and of a section corresponding to the section of the hollow cores. They are situated outside the mouth-piece and may be moved vertically by means of the rod $e$, which is preferably made of flat iron having its flatness in the direction of the column because then the clay reunites more easily behind the same. A housing $f$ is provided for each of the slides. The clay pressed into the mouth-piece by the press is divided by the hollow core $b$ into an outer hollow column and an inner solid column. If the inner end of the tubular body $b$ is closed by the downward movement of the cutter $a$, the column of clay within the hollow body will not continue to move forward, that is to say, the inner solid column will be severed and consequently a hollow column will be formed until the cutter is withdrawn and the entrance opened into the hollow core. In this manner and as shown in Fig. 2, a hollow column of bricks with properly situated closing plugs is obtained. By severing the column at $g$, hollow bricks are obtained which are closed at their ends and have a thickness $h$ at their sides. Preferably, the length of the hollow core $b$ is such that it corresponds to the desired plugs because the inner clay which has already once been severed and is subsequently again moved forward is then taken along more easily by the surrounding clay. Any multiple of this length may be obtained.

The core may be of any desired cross section, that is to say, it need not be of the cylindrical or prismatic form shown in the drawings. It is supported in such a manner that its end is close to the exit face of the mouth-piece and is equally wide at the front and back or conical. The arrangement and movement of the slides may be different to that shown in the drawings.

Various means are employed for operating the closing device with or without jointed connections and the production and insertion of the inner clay plugs may be effected by any suitable mechanism.

As shown in Fig. 2 the vent holes in the clay plugs are formed by means of a tongue $m$ situated in the hollow core $b$. This tongue extends forward into the mouth-piece and acts like a core, and I may employ one or more of said tongues located adjacent to either the top or bottom of the hollow core or both as preferred, and in Fig. 2 I have shown two of said tongues, the one $m$ located at the top and the other $m'$ located at the bottom of the hollow core.

A better union between the inserted closing plugs and the outer hollow column may be attained in various ways of which the following are examples. If the tongue is situated close to or is fixed directly upon the hollow core or in a corner of the same when the core is of polygonal shape then the clay which is removed for forming the hole is pressed partly against the inner column and partly against the outer column. This effect is much accentuated when the tongues, which are usually of circular section throughout, are thicker and of spoon shape outside the hollow core. In Fig. 2 the tongue $m'$ is shown as provided with a spoon shaped end $m^2$.

Figs. 3, 4, 5 and 6 illustrate a modification. Outside the mouth-piece $f^1$ and above the holes $z$ in its wall is fitted a fork $n^1$ the prongs of which are marked $i$. The fork is supported by spring $k$ in a plane just in front of the front end of the core $b$. The rod $l$ of the slide $a$ is, in this construction, provided with a projection $n$ by means of which during the downward movement of the slide, the fork is at the same time caused to move downward. The projection $n$ is sufficiently elastic to slip off of the fork $i$, when the latter reaches the lowest point of its movement, and the fork at once rises again under the action of the springs. Consequently the prongs only pass through the upper wall $o$ of the hollow column into the inner plug $x$ for a moment; that is to say, a few holes are formed and the clay which is pushed away effects a better union between the cross walls and the hollow column. It is further possible, by adjusting the position of the hollow core which forms the closing plugs, to secure the plugs more firmly in the hollow column. If, for example, the hollow core is not placed quite so near to the exit opening of the mouth-piece, then the hollow column will tend to contract after passing the hollow core and before leaving the mouth-piece. There is, therefore, a tendency to form a column with a smaller hollow. If, however, the hollow core is placed farther into the interior of the mouth-piece, then the clay plugs are gripped more tightly owing to the inward pressure exerted by it.

Figs. 7 and 8 illustrate arrangements for severing the clay plugs. In this case the tongue $m$ is revolubly mounted in a socket $p$ and is provided at the front end of the hollow core with a needle $q$. At the other end there is situated a plate $r$ having a number of horizontal teeth $s$. The slide $a$ is also provided with a number of teeth $t$. If now, the slide is pushed down to close the hollow core the teeth will mesh and the tongue and needle will revolve. Thus the plug which has just been expressed from the hollow core is cut off uniformly at the back end. The revolution of the tongue may be effected in any other desired manner. If the needle is made sufficiently long it will extend into the outer hollow column, thus displacing particles of clay from the outer column and closing the space between the plug and the inner surfaces of the walls of the column.

Fig. 9 shows in perspective a column with grooved walls being pressed out at the mouth-piece $f^1$. In order to indicate the places at which the plugs are inserted in the hollow column, the toothed plate $u$ having teeth which are wider than those forming the grooves is inserted in the mouth-piece. This plate is so connected to the part which actuates the cutter or slide $a$ that it passes through the slot $v$ into the mouth-piece $f^1$ and marks the exterior of the column wherever the closing stops are inserted into the hollow column by withdrawing the slide from the hollow core and is raised when the hollow part of the column is passing beneath it. This marking device can be omitted where the marking fork $i$ is employed, if desired. By this means the position of the plugs is indicated at $w$ to the operator at the severing table so that he may know exactly where the plugs of the column are located and so prevent the column being cut at the wrong place.

Claims.

1. In an apparatus for manufacturing hollow bricks with closed ends, the combination with the mouth piece, of a core open at both ends supported within said mouth piece and means for intermittently closing said hollow core.

2. In an apparatus for the manufacture of hollow bricks with closed ends, the combination with the mouth piece, of a hollow core open at both ends supported within the mouth piece, a space for the clay being provided on all sides of said core, a movable plate for closing one end of said hollow core, and operative means for bringing said plate into engagement with and removing it from said core.

3. In an apparatus for the manufacture of hollow bricks with closed ends, the combination with the mouth piece, of a hollow core open at both ends, supported within the mouth piece so as to provide a space surrounding the core, within the mouth piece, a movable part for intermittently closing said core, and devices for displacing portions of the clay adjacent to the meeting faces of the hollow column, passing outside of the hollow core, and the closing plugs passing through said hollow core, to cause said plugs to unite firmly with the walls of the hollow column.

4. In an apparatus for the manufacture of hollow bricks with closed ends, the combination with the mouth piece, of a hollow core open at both ends supported within the mouth piece, so as to provide a space surrounding the core within the mouth piece and a movable part for intermittently closing said core, said core being provided with a device for cutting the portion of the clay passing through the same longitudinally thereof to form venting apertures in said blocks.

5. In an apparatus for the manufacture of hollow bricks with closed ends, the combination with the mouth piece, of a hollow core open at both ends, supported within the mouth piece, so as to provide a space surrounding the core within the mouth piece and a movable part for intermittently closing said core, said core being provided with a longitudinally disposed tongue arranged in the path of the portion of the clay passing through said core, to form venting apertures in said blocks.

6. In an apparatus for the manufacture of hollow bricks with closed ends, the combination with the mouth piece, of a hollow core open at both ends, supported within the mouth piece, so as to provide a space surrounding the core within the mouth piece and a movable part for intermittently closing said core, a plurality of prongs disposed perpendicularly to the travel of the column, and means for intermittently moving said prongs toward and from the column, to cause them to pass through the closed portion thereof and lock the exterior and interior portions together.

7. In an apparatus for the manufacture of hollow bricks with closed ends, the combination with the mouth piece, of a hollow core open at both ends, supported within the mouth piece, so as to provide a space surrounding the core within the mouth piece and a movable part for intermittently closing said core, and devices for marking the exterior of the column to indicate the location of the interior blocks.

8. In an apparatus for the manufacture of hollow bricks with closed ends, the combination with the mouth piece, of a hollow core open at both ends, supported within the mouth piece, so as to provide a space surrounding the core within the mouth piece and a movable part for intermittently closing said core, movable marking devices for engaging the exterior of the column, while the interior block is passing said marking device.

9. In an apparatus for the manufacture of hollow bricks with closed ends, the combination with a mouth piece for delivering a column of clay, of a hollow core, supported within said mouth piece, and providing a space surrounding the same, a movable device for intermittently closing said core, and and a device for cutting off the portion of the column passing through said core located at a distance from said closing device.

10. In an apparatus for the manufacture of hollow bricks with closed ends, the combination with a mouth piece for delivering a column of clay, of a hollow core, supported within said mouth piece, and providing a space surrounding the same, a movable device for intermittently closing one end of said core and a cut off device at the other end of said core.

11. In an apparatus for the manufacture of hollow bricks with closed ends, the combination with a mouth piece for delivering a column of clay, of a hollow core, supported within said mouth piece, and providing a space surrounding the same, a movable device for intermittently closing one end of said core, and a rotary cut off device at the other end of said core.

12. In an apparatus for the manufacture of hollow bricks with closed ends, the combination with a mouth piece for delivering a column of clay, of a hollow core, supported within said mouth piece and providing a space surrounding the same, a movable device for intermittently closing one end of said core, a cut off device at the other end of said core, and operative connections between said closing device and the cut off.

13. In an apparatus for the manufacture of hollow bricks with closed ends, the combination with a mouth piece for delivering a column of clay, of a hollow core, supported within said mouth piece, and providing a space surrounding the same, a movable device for intermittently closing one end of said core, a rotary cut off device at the other end of said core, a pinion operatively connected with said cut off for operating the same, and a rack on said closing device for operating said pinion.

WILHELM SCHLEUNING.

Witnesses:
 HENRY HASPER,
 WOLDEMAR HAUPT.

Copies of this patent may be obtained for five cents each, by addressing the "Commissioner of Patents, Washington, D. C."